F. HYDE.
FASTENING DEVICE.
APPLICATION FILED MAR. 17, 1920.

1,373,507.

Patented Apr. 5, 1921.

Inventor:
Frank Hyde,

UNITED STATES PATENT OFFICE.

FRANK HYDE, OF SIOUX FALLS, SOUTH DAKOTA.

FASTENING DEVICE.

1,373,507. Specification of Letters Patent. Patented Apr. 5, 1921.

Application filed March 17, 1920. Serial No. 366,478.

*To all whom it may concern:*

Be it known that I, FRANK HYDE, a citizen of the United States, and a resident of Sioux Falls, in the county of Minnehaha and State of South Dakota, have invented certain new and useful Improvements in Fastening Devices, of which the following is a specification.

The object of my invention is to provide a simple construction of a bar-shaped adjustable pin intended more particularly for holding the front portions of soft collars together, the said pin being adapted to engage the two front portions or flaps of the collar and to extend in rear of a four-in-hand tie when such is used as a part of the neck-wear.

In the accompanying drawing:—

Figure 1:
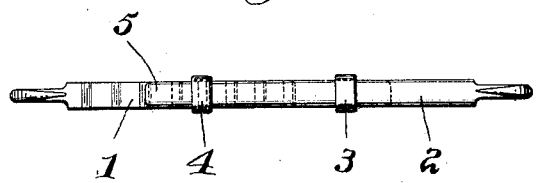

Figure 1 represents a plan view of the bar pin; and

Figure 2:
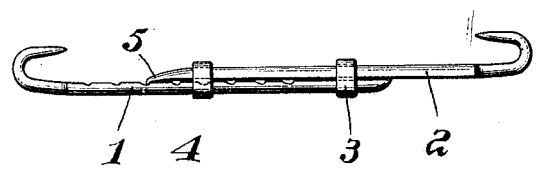

Fig. 2 a side elevation.

The pin is made up of two members 1, 2, having contiguous flat faces and slidably mounted one upon the other. Each member has a hook at its outer end adapted to engage the collar or other part of wearing apparel with which the pin may be combined or used, and the two members are slidably held together by a band or loop on each member encircling the bar portion of the other member. These loops are indicated at 3 and 4.

One of the members is provided with a series of notches or cross grooves in its flat face and the other member is provided with an extension 5 beyond the band or loop portion belonging to that member and the end of this extension is adapted to seat itself in the grooves or notches as the bars are moved longitudinally in relation to each other. This extension 5 has a certain degree of resilience so that it will spring down in any one of the grooves or notches to which this end may be moved by the longitudinal relative adjustment of the two members. The bands or loops keep the two members in close contact, and the extension 5 projecting as it does only a comparatively short distance beyond the loop or band carried by the bar having this extension, the said extension will be firmly held to its work in engaging the notches and thus holding the two sliding members in the various positions of adjustment to increase or decrease the length of the pin. The outer faces of the members of the bar are rounded in a transverse direction and these faces may be ornamented by any suitable design as may be desired.

The longitudinal axis of the extension 5 is in line substantially with the longitudinal axis of the member to which it is attached.

I claim as my invention:

1. In combination in a fastening device, two members arranged face to face and slidable lengthwise in relation to each other, a loop carried by each member and embracing the other member and slidable thereon, one of said members having a series of notches and the other member having an extension beyond its loop with its longitudinal axis in line with the main body of the member, the end of said extension being adapted to engage the notches to hold the two members in different positions to which they may be adjusted, substantially as described.

2. In combination in a fastening device, two bar-shaped members, each having a hook at its end and arranged face to face, means carried by each member for slidably holding the two members together, one of said members having notches or grooves disposed at different points along its face and the other member having a spring end to engage the notches for holding the members in different positions relative to each other the spring end having its longitudinal axis in line with the longitudinal axis of the main part of the member, substantially as described.

3. In combination in a fastening device, two bar shaped members arranged face to face, and each having a hook at one end, means for slidably holding the members together, one of said members having notches in its face which lies against the face of the other member, and said other member having an extension beyond the holding means overlying the notched face of the member first mentioned and having its end adapted to engage said notches, substantially as described.

In testimony whereof, I affix my signature.

FRANK HYDE.